United States Patent

Sinta et al.

[11] Patent Number: 6,107,425
[45] Date of Patent: Aug. 22, 2000

[54] NARROW MOLECULAR WEIGHT DISTRIBUTION POLYMERS AND USE OF SAME AS RESIN BINDERS FOR NEGATIVE-ACTING PHOTORESISTS

[75] Inventors: Roger F. Sinta, Woburn; George G. Barclay, Allston; Jacque H. Georger, Jr., Holden; Mark D. Denison, Cambridge; Sheri L. Ablaza, Brookline, all of Mass.

[73] Assignee: Shipley Company, L.L.C., Marlborough, Mass.

[21] Appl. No.: 09/020,276

[22] Filed: Feb. 6, 1998

[51] Int. Cl.[7] ............................. C08F 12/24; C08F 2/00; C08F 20/10; C08F 12/02
[52] U.S. Cl. .................... 526/313; 430/270; 526/346; 526/213; 526/217; 526/328
[58] Field of Search .................. 526/313, 213, 526/217, 328; 430/270

[56] References Cited

U.S. PATENT DOCUMENTS

| | | |
|---|---|---|
| 4,581,429 | 4/1986 | Solomon et al. . |
| 5,013,806 | 5/1991 | Blevins et al. .......................... 526/271 |
| 5,071,932 | 12/1991 | Blevins et al. .......................... 526/271 |
| 5,128,231 | 7/1992 | Itoh et al. ............................. 430/270.1 |
| 5,322,912 | 6/1994 | Georges et al. . |
| 5,324,788 | 6/1994 | Kuo . |
| 5,340,696 | 8/1994 | Thackeray et al. . |
| 5,356,753 | 10/1994 | Yamada et al. . |
| 5,412,050 | 5/1995 | Watanabe et al. ....................... 526/313 |
| 5,492,793 | 2/1996 | Breyeta et al. .......................... 522/301 |
| 5,523,370 | 6/1996 | Watanabe . |
| 5,578,687 | 11/1996 | Sounik et al. .......................... 526/212 |
| 5,625,020 | 4/1997 | Breyta et al. ......................... 526/329.2 |
| 5,807,947 | 9/1998 | Vicari et al. ............................. 526/313 |
| 5,844,057 | 12/1998 | Watanabe et al. ....................... 526/313 |
| 5,882,835 | 3/1999 | Park et al. ............................. 430/170 |

*Primary Examiner*—Christopher Henderson
*Assistant Examiner*—Tanya Zalukaeva
*Attorney, Agent, or Firm*—Peter F. Corless; Darryl P. Frickey; S. Matthew Cairns

[57] ABSTRACT

The invention provides inter alia new methods to produce aqueous developable resin binders for negative-acting photoresists. The methods in general comprise free radical polymerization of one or more types of monomers in the presence of a free radical polymerization control agent, particularly a nitroxide polymerization control agent such as a piperidinyloxy (N-oxy) free radical, and wherein at least one of the monomer types contains a moiety that enables aqueous solution development of a photoresist composition containing the formed polymer.

28 Claims, 1 Drawing Sheet

NARROW MOLECULAR WEIGHT DISTRIBUTION POLYMERS AND USE OF SAME AS RESIN BINDERS FOR NEGATIVE-ACTING PHOTORESISTS

BACKGROUND OF THE INVENTION

1. Field of the Invention

The present invention relates to new polymers having narrow molecular weight distribution (low Mw/Mn values) and methods for producing such polymers. The invention also relates to aqueous developable photoresist compositions that contain such polymers as a resin binder component. It has been found that use of the polymers as a resist binder provides significantly improved lithographic properties, including enhanced resolution of a patterned resist coating layer.

2. Background

Photoresists are photosensitive films used for transfer of images to a substrate. A coating layer of a photoresist is formed on a substrate and the photoresist layer is then exposed through a photomask to a source of activating radiation. The photomask has areas that are opaque to activating radiation and other areas that are transparent to activating radiation. Exposure to activating radiation provides a photoinduced chemical transformation of the photoresist coating to thereby transfer the pattern of the photomask to the photoresist coated substrate. Following exposure, the photoresist is developed to provide a relief image that permits selective processing of a substrate.

A photoresist can be either positive-acting or negative-acting. For most negative-acting photoresists, those coating layer portions that are exposed to activating radiation polymerize or crosslink in a reaction between a photoactive compound and polymerizable reagents of the photoresist composition. Consequently, the exposed coating portions are rendered less soluble in a developer solution than unexposed portions. For a positive-acting photoresist, exposed portions are rendered more soluble in a developer solution while areas not exposed remain comparatively less developer soluble.

In general, photoresist compositions comprise at least a resin binder component and a photoactive agent. Photoresist compositions are described in Deforest, *Photoresist Materials and Processes*, McGraw Hill Book Company, New York, ch. 2, 1975 and by Moreay, *Semiconductor Lithography, Principles, Practices and Materials*, Plenum Press, New York, ch. 2 and 4, both incorporated herein by reference for their teaching of photoresist compositions and methods of making and using the same.

Photoresist resin binders have been produced by several methods, particularly conventional radical, cationic, anionic or condensation processes. However, these prior approaches pose some notable drawbacks.

For example, prior synthetic processes often produce polymers that have a relatively large (e.g., greater than about 2 to 5) molecular weight distribution. Such a large molecular weight distribution can render a resist formulation unsuitable for many commercial applications, particularly high performance applications where highly resolved images of submicron dimensions are required. For example, a large molecular weight distribution can vary the dissolution rate across a resist coating layer which can result in field residues upon development, or otherwise compromise resolution.

Additionally, some prior approaches for synthesis of resist resin binders are inconvenient for large-scale productions. For example, an anionic synthesis is often difficult to control due to impurities such as water or oxygen that are frequently present. Even a small amount of such impurities can have a substantial effect on the polymer synthesis.

It thus would be desirable to have new methods for producing photoresist resin binders, particularly resin binders having a relatively narrow molecular weight distribution (Mw/Mn).

SUMMARY OF THE INVENTION

We have now found new methods to produce aqueous developable resin binders for negative-acting photoresists. These methods in general comprise free radical polymerization of one or more types of monomers in the presence of a free radical polymerization control agent, particularly a nitroxide polymerization control agent such as a piperidinyloxy (N-oxy) free radical reaction control agent, and wherein at least one of the monomers contains a moiety that enables aqueous solution development of a photoresist composition containing the formed polymer.

Both "unimolecular" initiation systems (a polymerization control agent is used without a separate free radical initiator such as a peroxide or other initiator) and "bimolecular" initiation systems (a polymerization control agent is used together with a separate free radical initiator) may be employed. However, use of a unimolecular system is generally preferred because it can produce polymers that exhibit comparatively decreased optical densities.

The synthetic methods of invention provide a polymer that has remarkably narrow molecular weight distribution (Mw/Mn), preferably a ratio of weight average molecular weight to number average molecular weight of about 2.0 or less, more preferably a ratio of about 1.7 or less, still more preferably a Mw/Mn ratio of about 1.5 or less. Polymers having a molecular weight distribution (Mw/Mn) of from 1.0 to about 1.5 are particularly preferred.

Moreover, the synthetic methods of the invention enable preparation of such narrow polydispersity polymers that also have low molecular weights. For examples preferred polymers of the invention have molecular weights (Mn) of about 5,000 daltons or less, more preferably about 3,500 daltons or less, still more preferably a molecular weight (Mn) of about 2,500 daltons or less. For use as photoresist resin binders, generally preferred polymers will have a minimum Mn of at least about 1,000 daltons, i.e. preferred low molecular polymers for use as resin binders will have a Mn of between about 1,000 and 5,000 daltons.

Polymerization control agents may be used other than the preferred nitroxide agents. In particular, a suitable alternate multi-molecular system comprises 1) an alkyl-substituted halide, particularly chloride, 2) a copper I halide compound such as CuCl and 3) 2,2'-bipyridine and suitable solvent.

The invention also provides negative-acting photoresist compositions that contain a resin binder with a narrow molecular weight distribution as can be produced by the above discussed methods of the invention. Preferred photoresists of the invention include chemically-amplified resist compositions which undergo a photoacid-promoted crosslinking reaction to render exposed regions of a coating layer less developer soluble than unexposed regions.

It has been found that a photoresist composition comprising a resin binder component prepared by the methods of the invention provides highly resolved patterned images (e.g., a line having essentially vertical sidewalls) of sub-micron and sub-half micron dimensions, including highly resolved lines having a width of less than about 0.40 microns, or even about 0.25 microns or less.

Moreover, it has been surprisingly found that the resin binders of the invention exhibit significantly enhanced thermal stability relative to comparable resins that have broader polydispersities (such as Mw/Mn of greater than 1.7). For example, polymers of the invention have glass transition temperatures of between about 170–200° C. at molecular weights (Mn) of about 3,000 to 30,000. Such enhanced thermal stability can be critical for photolithographic applications. For example, use of a high Tg binder can avoid potential degradation of the resist relief image during etching or other processing of the underlying substrate surface.

As mentioned above, it also has been surprisingly found that resins prepared using a unimolecular initiating system exhibit substantially decreased absorbance of exposure radiation, including deep UV radiation, relative to comparable resins prepared using a bimolecular initiating system. For example, preferred polymers of the invention prepared using a unimolecular initiation system have optical densities of about 0.5 absorbance units per micron at 248 nm, or even about 0.2 units/t or less at 248 nm.

Such decreased absorbance is a substantial benefit for photolithographic applications. For example, a resist coating layer containing polymer(s) of the invention with low optical density can exhibit increased photospeed relative to a comparable resist that contains a more highly absorbing resin binder. Sufficiently high photospeed is important or even critical in many applications, e.g. where a number of exposures are needed such as in generating multiple patterns by a step and repeat process, or where activating energy of reduced intensity is employed. Sufficiently high photospeed also permits reduction in the concentration of the radiation sensitive component in the photoresist. Lower absorbing resist formulations also can provide higher resolution and higher profiles due to more even distribution of photons (acid) within a resist film. Low absorbing resists are particularly advantageous when used on low reflecting substrates such as antireflective coatings.

The invention also provides methods for forming relief images, including methods for forming a highly resolved relief image such as a pattern of lines wherein each line has essentially vertical sidewalls and a line width of less than about 0.40 microns, or even less than about 0.25 microns. The invention further provides articles of manufacture comprising substrates such as a microelectronic wafer or a liquid crystal display or other flat panel display substrate having coated thereon the photoresists and relief images of the invention. Other aspects of the invention are disclosed infra.

DETAILED DESCRIPTION OF THE INVENTION

Figure 1:
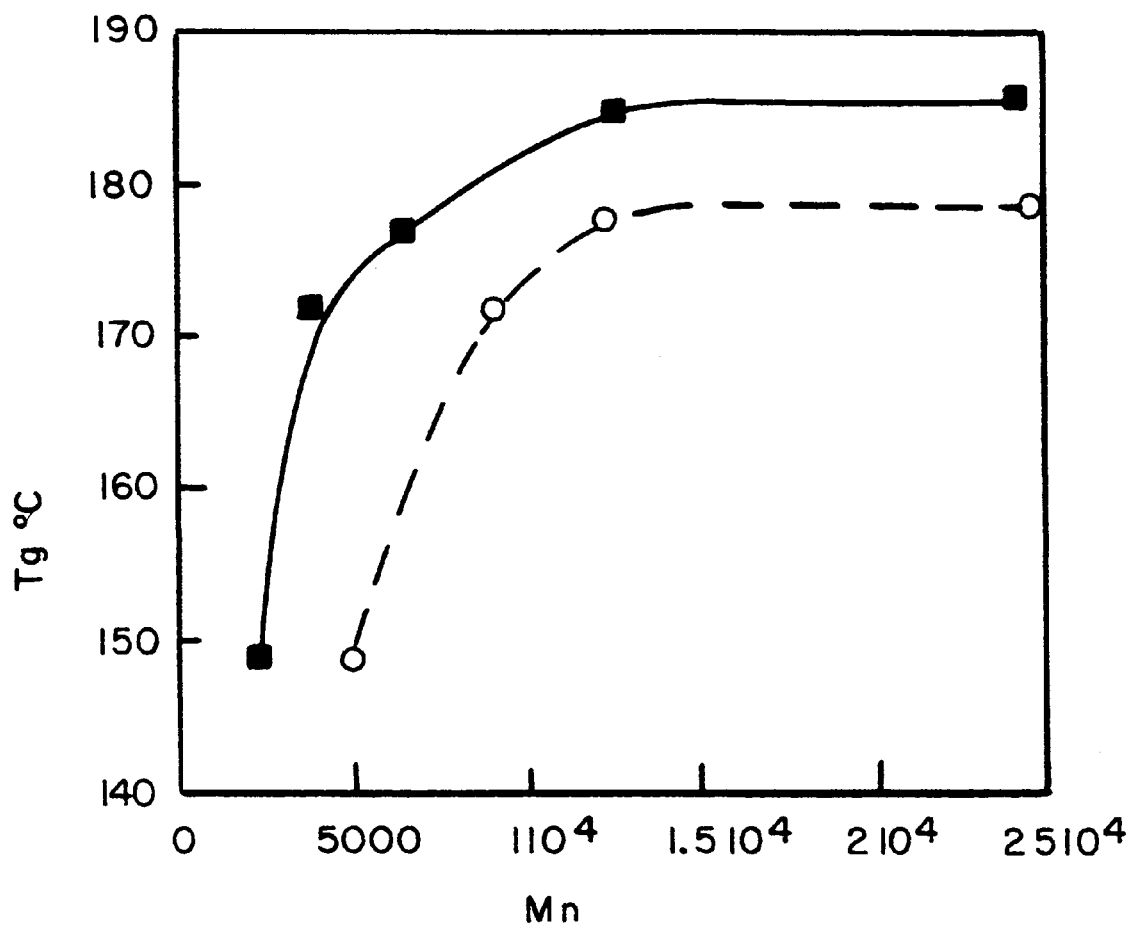
FIG. 1 depicts graphically the results of Example 3 which follows.

The synthetic methods of the invention in general comprise free radical polymerization of one or more different types of monomers in the presence of a free radical polymerization control agent. At least one of the monomers contains a moiety that enables aqueous development of a photoresist composition containing the formed polymer. For example, as discussed more fully below, a monomer may contain a hydroxy group, or a "masked" group such as an acetate group that can be hydrolyzed to a hydroxy or other moiety after polymer formation.

The free radical polymerization control agent may be a variety of compounds, and preferably is a nitroxide such as a piperidinyloxy (N-oxy) compound. Suitable piperidinyloxy compounds include e.g. those compounds that exist as a stable radical or can generate a radical intermediate of the following formula:

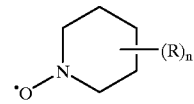

where each R is independently a halogen (F, Cl, Br, I), substituted or unsubstituted alkyl preferably having 1 to about 8 carbon atoms, or substituted or unsubstituted aryl preferably having 6 to about 18 aromatic carbons such as phenyl; and n is an integer of from 0 (where the piperidine ring is fully H-substituted) to 10. Suitable substituents of substituted alkyl and aryl groups include e.g. halogen, $C_{1-8}$ alkyl, etc.

Preferred piperidinyloxy polymerization control agents of the above formula are di-alkyl substituted at both the 2 and 6 piperidinyl ring positions, particularly by $C_{1-4}$ alkyl. A particularly preferred compound is following radical 1:

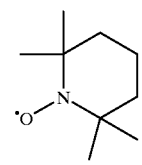

1

This compound 1 is known as TEMPO and is commercially available as a stable radical. It is a preferred polymerization control agent for a bimolecular initiation system.

Also, the polymerization control agent itself (prior to generation of a radical intermediate) may have a variety of moieties bonded to the oxy group such as e.g. a substituted or unsubstituted benzyl, allyl, etc. group, particularly for use of the control agent in unimolecular initiation systems. For example, compounds of the following formula are particularly preferred:

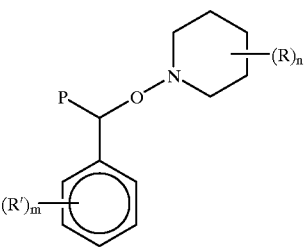

where P is a substituted or unsubstituted alkyl group having from 1 to about 6 carbon atoms; R and n are each as defined above; each R' is independently selected from the same group as specified above for R; and m is an integer of from 0 (where the phenyl ring is fully hydrogen-substituted) to 5. While the above-depicted substituted or unsubstituted phenyl is preferred, that phenyl group also could be substituted by other aryl groups such as a substituted or unsubstituted naphthyl group and the like. Suitable substituents of substituted P groups include e.g. one or more halo, $C_{1-6}$ alkyl, $C_{1-6}$ haloalkyl such as trifluoromethyl, $C_{1-6}$ alkoxy, etc.

A preferred polymerization control agent, particularly for use in a unimolecular initiation system, is the following compound 2:

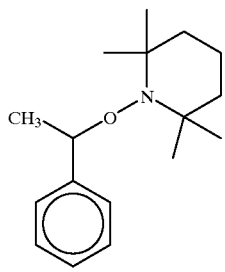

2

Compounds of the above structure 2 and having 1 to 5 R' phenyl ring substituents (where each R' is the same as defined above with respect to previous formula) also will be preferred polymerization control agents, particularly for unimolecular initiation systems.

Such polymerization control agents are commercially available or can be prepared by known procedures. See, for example, C. J. Hawker, *J. Am. Chem. Soc.*, 116:11185–11186 (1994).

As discussed above, in preferred aspects of the invention, a unimolecular initiation system is employed, e.g. a nitroxide agent of the above formulae is used without any additional free radical initiator compound. It has been found that use of such a unimolecular initiation can produce polymers that exhibit decreased optical densities at photoresist exposure wavelengths, including at deep UV wavelengths of 350 or 300 nm or less. See Example 4 which follows.

For a bimolecular initiation system, where a separate free radical initiator is used in combination with the polymerization control agent, a wide variety of free radical initiators may be employed. For example, a variety of peroxides will be suitable such as peroxides, peresters, peracids and persulfates. Tert-butyl peroctonoate and benzoyl peroxide are specifically preferred initiators. Diazo compounds also can be employed. as initiators in combination with a polymerization control agent.

Other polymerization control systems also may be employed. For example, as discussed above, a suitable system includes use of 1) an alkyl-substituted halide, particularly chloride, 2) a copper I species such as CuCl and 3) 2,2'-bipyridine and a suitable solvent. The alkyl-substituted halide reagent includes aryalkyl halides such as phenyl($C_{1-6}$alkyl)halides. 1-Phenyl-2-choro-ethylene is a preferred reagent. See K. Matyjaszewski et al., *Macromolecules*, 28:2093 (1995) for a discussion of use of such a Cu-based system.

To generate a polymer of the invention, a single type of monomer may be employed to provide a homopolymer, or a mixture of monomers can be employed to provide a copolymer, provided at least one of the monomers of the mixture comprises a moiety that enables aqueous development of a photoresist composition containing the formed polymer. For example, to provide aqueous alkaline development, monomers can be employed that contain a carboxy or hydroxy group, e.g., hydroxystyrene.

Also, as discussed above, to facilitate polymer synthesis, a monomer may be reacted with a hydroxy or other reactive group in "masked" form. For example, vinylphenylacetate may be employed as a "masked" form of hydroxystyrene. Other phenol masking or protecting groups also will be suitable such as an alkylsilyl groups (to form silyethers with the phenolic moiety), e.g.$(CH_3)_3Si$—, $(CH_3)_2(butyl)Si$—, $((CH_3)_3C)_3Si$—, etc.; other alkyl esters, e.g. $CH_3CH_2C(=O)$—, etc. After reaction completion, the masking groups may be removed under either basic or acidic conditions. For example, the formed polymer may be heated in the presence of a base such as $NH_4OH$ or $NH_4OAc$. See Example 1 Part B, which follows, for exemplary conditions. For an acidic hydrolysis, HCl or other acid may be used.

The polymerization reaction of the invention typically is conducted under an inert atmosphere (e.g., $N_2$ or argon) and at elevated temperatures, e.g. at about 100° C. or greater, such as from about 120 to 130° C., although reaction temperatures may vary depending on reactivity of the particular reagents employed and the boiling point of the reaction solvent (if a solvent is employed). Suitable reaction temperatures as well as other reaction conditions for any particular system can be readily determined empirically by those skilled in the art based on the present disclosure. With a unimolecular initiation system, elevated reaction temperatures of about 100° C. or greater generally will be required in order to generate a radical species in situ.

A reaction solvent may be employed if desired. Relatively high boiling solvents such as an aromatic solvent, e.g. benzene, chlorobenzene, toluene or xylene are generally preferred. Dimethylsulfoxide and dimethylformamide also may be employed. Reaction solutions also should be relatively concentrated, e.g. a 1:1 (v/v) ratio of reagents to solvent, to promote a reasonable reaction rate. The polymerization reaction also may be run neat.

A variety of polymers may be produced and used as a resist resin binder in accordance with the invention. Poly (vinylphenols) are particularly preferred. Acrylics are also preferred. Copolymers of substituted or unsubstituted vinylphenols are particularly preferred such as acrylic-vinylphenol copolymers, styrene-vinylphenol copolymers and the like. Such polymers are prepared in accordance with the synthetic methods of the invention, wherein substituted or unsubstituted vinylphenols (preferably with a hydroxy masking group) are reacted in the presence of a polymerization control agent or system with other monomers such as a substituted or unsubstituted styrene or acrylic monomers e.g. acrylate, methacrylate, methyl methacrylate, t-butylacrylate or t-butylmethacrylate, etc. Suitable ring substituents of substituted vinylphenols include e.g. halo, $C_{1-6}$ alkyl, $C_{1-6}$ haloalkyl such as trifluoromethyl, $C_{1-6}$ alkoxy, etc. Also preferred will be copolymers formed in accordance with the invention from vinyl alicyclics such as a vinyl norboranyl or vinyl cyclohexanol compound, polymerized together with e.g. a vinylphenol or masked vinylphenol. Also, a poly(vinylphenol) prepared by the methods of the to invention can be partially hydrogenated by procedures disclosed in U.S. Pat. Nos. 5,368,993 and 5,128, 232, both to Thackeray et al., to provide a nonaromatic cyclic alcohol-phenol copolymer.

Polymers having "inert" blocking groups also may be employed as resin binder components of photoresists of the invention. The term "inert" as used in connection with a blocking group means the blocking group is chemically unreactive in the presence of acid or base generated during exposure of a photoresist composition containing the polymer. Such polymers may be prepared by alkaline condensation of a polymer having hydroxyl moieties prepared in accordance with the present invention with a compound that combines with the polymer's hydroxyl groups to form the blocking group. For instance, where the blocking group is a preferred sulfonic acid ester, a sulfonic acid halide is added to a solution of the polymer (e.g. a poly(vinylphenol) or a vinylphenol copolymer) and a suitable base and the mixture is stirred typically with heating. A variety of bases may be employed for the condensation reaction including hydroxides such as sodium hydroxide. Suitable reaction solvents include e.g. ethers such as diethyl ether and tetrahydrofuran and ketones such as methyl ethyl ketone and acetone. Suitable conditions for the condensation reaction can be determined based upon the constituents used. The percentage substitution of the polymer with the blocking group can be controlled by the amount of the blocking group precursor condensed with the polymer. The percent substitution on the hydroxyl sites of the polymer binder can be readily ascertained by proton or $^{13}C$ NMR. Suitable blocking groups include e.g. alkoxy groups such as methoxy, ethoxy, propoxy, n-butoxy, sec-butoxy, t-butoxy, etc.; alkyl esters represented by RCOO— wherein R is preferably an alkyl group having 1–4 carbon atoms such as methyl, ethyl, propyl, isopropyl, butyl, sec-butyl, t-butyl, etc.; a sulfonyl ester such as methanesulfonyl, ethanesulfonyl, propanesulfonyl, benzenesulfonyl and toluene-sulfonyl esters, etc. Cyanbenzosulfonyl esters, naphthylsulfonyl esters and anthracenylsulfonyl esters are particularly preferred inert blocking groups, particularly for use in a deep UV resist. Use of a polymer containing such inert blocking groups as a resist resin binder can provide enhanced lithographic properties, including reduced microbridging (a series of fine tendrils or strands of unremoved photoresist passing between adjacent photoresist features in a developed photoresist coating). Polymers having blocking groups is described in commonly assigned U.S. application Ser. No. 08/405,800, issuing as U.S. Pat. No. 5,514,520 on May 7, 1996.

Preferred weight average molecular weights of polymers of the invention include those that having a Mw of at least about 1,000 daltons, more preferably from about 2,000 to about 100,000 daltons, more typically from about 2,000 to 20,000 or 25,000 daltons.

Molecular weights (either Mw or Mn) of the polymers of the invention are suitably determined by gel permeation chromatography.

As discussed above, the polymers of the invention are highly useful as the resin binder component of negative-acting photoresist compositions. More particularly, photoresists of the invention typically comprise a photoactive component, a crosslinker component and a resin binder component that comprises the above-described polymer.

The resin binder component should be used in an amount sufficient to render a coating layer of the resist developable with an aqueous alkaline developer.

A particularly preferred class of photoresists for use in accordance with the present invention are those chemically amplified compositions that comprise the above described polymer of the invention as a resin binder, a photoacid generator and one or more other materials that will result in curing, crosslinking or hardening of the composition upon exposure to activating radiation and, typically, heating. A preferred composition is an acid-hardening photoresist that comprises a photoacid generator, a resin binder that comprises the narrow molecular weight distribution polymer(s) of the invention, and an amine-based crosslinker such as the melamine-formaldehyde Cymel resins or glycourils such as those available under the tradename of Powderlink 1174, both classes of materials available from American Cyanamid. Such acid-hardening resists are described, e.g., in European Patent Applications 0,164,248 and 0,232,972 and U.S. Pat. No. 5,128,232.

A variety of photoacid generators (PAGs) may be used as the photoactive component in the photoresists of the invention. Sulfonate PAGs are generally preferred including sulfonated esters and sulfonyloxy. See *J. of Photopolymer Science and Technology,* 4(3):337–340 (1991), for disclosure of suitable sulfonate PAGs, including benzoin tosylate, t-butylphenyl alpha-(p-toluenesulfonyloxy)-acetate and t-butyl alpha-(p-toluenesulfonyloxy)-acetate. Preferred sulfonate PAGs are also disclosed in U.S. Pat. No. 5,344,742 to Sinta et al. A particularly preferred agent is trifluoroacetate sulfonate.

Onium salts are also generally preferred acid generators of compositions of the invention. Onium salts that weakly nucleophilic anions have been found to be particularly suitable. Examples of such anions are the halogen complex anions of divalent to heptavalent metals or non-metals, for example, Sb, Sn, Fe, Bi, Al, Ga, In, Ti, Zr, Sc, D, Cr, Hf, and Cu as well as B, P, and As. Examples of suitable onium salts are diaryl-diazonium salts and onium salts of group Va and B, la and B and I of the Periodic Table, for example, halonium salts, quaternary ammonium, phosphonium and arsonium salts, aromatic sulfonium salts and sulfoxonium salts or selenium salts. Examples of suitable preferred onium salts can be found in U.S. Pat. Nos. 4,442,197; 4,603,101; and 4,624,912.

Other useful acid generators include the family of nitrobenzyl esters, and the s-triazine derivatives. Suitable s-triazine acid generators are disclosed, for example, in U.S. Pat. No. 4,189,323.

Halogenated non-ionic, photoacid generating compounds are also suitable such as, for example, 1,1-bis[p-chlorophenyl]-2,2,2-trichloroethane (DDT); 1,1-bis[p-methoxyphenyl]-2,2,2-trichloroethane; 1,2,5,6,9,10-hexabromocyclodecane; 1,10-dibromodecane; 1,1-bis[p-chlorophenyl]-2,2-dichloroethane; 4,4-dichloro-2-(trichloromethyl) benzhydrol (Kelthane); hexachlorodimethyl sulfone; 2-chloro-6-(trichloromethyl) pyridine; o,o-diethyl-o-(3,5,6-trichloro-2-pyridyl) phosphorothionate; 1,2,3,4,5,6-hexachlorocyclohexane; N(1,1-bis[p-chlorophenyl]-2,2,2-trichloroethyl)acetamide; tris[2,3-dibromopropyl]isocyanurate; 2,2-bis[p-chlorophenyl]-1,1-dichloroethylene; tris[trichloromethyl]s-triazine; and their isomers, analogs, homologs, and residual compounds. Suitable photoacid generators are also disclosed in European Patent Application Nos. 0164248 and 0232972. Acid generators that are particularly preferred for deep U.V. exposure include 1,1-bis(p-chlorophenyl)-2,2,2-trichloroethane (DDT); 1,1-bis(p-methoxyphenol)-2,2,2-trichloroethane; 1,1 -bis(chlorophenyl)-2,2,2 trichloroethanol; tris(1,2,3-methanesulfonyl)benzene; and tris (trichloromethyl)triazine.

The polymers of the invention also may be used as a resin binder component in negative base-hardening photoresist compositions, i.e. compositions that contain a photobase generator compound and undergo a base-promoted crosslinking reaction upon exposure to activating radiation. Suitable photobase generator compounds and the use of base-hardening compositions are disclosed in U.S. Pat. No. 5,262,280 to Knudsen et al. Amine-based crosslinkers such as the above-discussed melamine resins are suitable for the base-hardening compositions.

Photoresists of the invention also may contain other optional materials, For example, other optional additives include anti-striation agents, plasticizers, speed enhancers, etc. Such optional additives typically will be present in minor concentration in a photoresist composition except for fillers and dyes which may be present in relatively large concentrations such as, e.g., in amounts of from about 5 to 30 percent by weight of the total weight of a resist's dry components (i.e. all components other than the solvent carrier).

A preferred optional additive is an added base, particularly tetrabutylammonium hydroxide (TBAH), or the lactate salt of TBAH, which can enhance resolution of a developed resist relief image. The added base is suitably used in relatively small amounts, e.g. about 1 to 20 percent by weight relative to the photoactive component (e.g. photoacid generator or photobase generator).

The photoresists of the invention are generally prepared following known procedures (see, e.g. U.S. Pat. Nos. 5,344,742 and 5,258,257 both to Sinta et al.) with the exception that the narrow molecular weight distribution polymer described above is substituted for prior resins used in the formulation of such photoresists. For example, a resist of the invention can be prepared as a coating composition by dissolving the components of the photoresist in a suitable solvent such as, e.g., ethyl lactate, a glycol ether such as 2-methoxyethyl ether(diglyme), ethylene glycol monomethyl ether, propylene glycol monomethyl ether, a Cellosolve ester such as methyl Cellosolve Acetate; an aromatic hydrocarbon such toluene or xylene; or a ketone such as methylethyl ketone. Typically the solids content of the photoresist varies between 5 and 35 percent by weight of the total weight of the photoresist composition.

The photoresists of the invention can be processed in accordance with known procedures. Though the photoresists of the invention may be applied as a dry film, they are preferably applied on a substrate as a liquid coating composition, dried by heating to remove solvent preferably until the coating layer it tack free, exposed through a photomask to activating radiation, optionally post-exposure baked to create or enhance solubility differences between exposed and nonexposed regions of the resist coating layer, and then developed preferably with an aqueous alkaline developer to form a relief image. The substrate suitably can be any substrate used in processes involving photoresists such as a microelectronic wafer. For example, the substrate can be a silicon, silicon dioxide or aluminum-aluminum oxide microelectronic wafer. Gallium arsenide, ceramic, quartz or copper substrates may also be employed. Substrates used for liquid crystal display and other flat panel display applications are also suitably employed, e.g., glass substrates, indium tin coated substrates and the like. A liquid coating resist composition may be applied by any standard means such as spinning, dipping or roller coating. The exposure energy should be sufficient to effectively activate the photoactive component of the radiation sensitive system to produce a patterned image in the resist coating layer. Suitable exposure energies typically range from about 10 to 300 mJ/cm$^2$. An exposure wavelength in the deep U.V. range (less than 350 or 300 nm) is preferably used for the photoresists of the invention, particularly an exposure wavelength of about 248 nm. Suitable post-exposure bake temperatures are from about 50° C., or greater, more specifically a temperature in the range of from 50° to 150° C. For an acid-hardening negative-acting resists, a post-development bake may be employed if desired at temperatures of from about 100° to 150° C. for several minutes to further cure the relief image formed upon development. After development and any post-development cure, the substrates surface bared by development may then be selectively processed, for example chemically etching or plating substrates areas based of photoresists in accordance with procedures known in the art. Suitable etchants include a hydrofluoric acid etching solution and a plasma gas etch such as an oxygen plasma etch.

All documents mentioned herein are fully incorporated herein by reference.

The following non-limiting examples are illustrative of the invention.

EXAMPLES 1–2

Preparation of Polymers of the Invention

Example 1

Preparation of Poly(4-hydroxystyrene).
Part A. Polymerization of 4-Acetoxystyrene.

Acetoxystyrene (75.0 g, 0.463 mol) was placed in a 250 mL round bottom flask and purged with $N_2$. The unimolecular initiating system 1-phenyl-1-(2',2',6',6'-tetramethyl-1'-piperidinyloxy)-ethane (1.21 g, 0.00463 mol) (with no separate free radical initiator used) was then added to the monomer. After addition of the initiator, the polymerization mixture was heated to 125–130° C., under $N_2$, and stirred for 48 hours. During the polymerization the polymer solidified in the reaction vessel. The reaction was then cooled to room temperature and the polymer dissolved in acetone (225 mL), and isolated by precipitation into hexanes (2250 mL). The polymer was then filtered, washed with hexanes and dried in a vacuum oven at 60° C. overnight. Isolated yield was 90% of theory, $M_n$=8997, $M_w/M_n$=1.10.

Part B. Deacetylation of Poly(4-acetoxystyrene).

To a gently refluxing slurry of poly(4-acetoxystyrene) (50.0 g, 0.308 mol) in methanol (200 ml), under $N_2$, ammonium hydroxide (24.25 g, 0.692 mol) dissolved in water (36 mL) was added dropwise over 15 minutes. After addition, the reaction mixture was gently refluxed for 18 hours, during which time the polymer went into solution. The reaction is then cooled to room temperature, and the polymer isolated by precipitation into water (1500 mL), filtered, washed well with water, and dried in a vacuum oven at 50° C. overnight. Isolated yield of poly(4-hydroxystyrene) was 80–90% of theory, $M_n$=6528, $M_w/M_n$=1.22, Tg=177° C.

Example 2

Additional polymers.

By procedures described above, the following four additional poly(4-hydroxystyrene) polymers were prepared having the characteristics as shown in the following Table 1.

TABLE 1

| Additional Poly(4-hydrostyrene) polymers | $M_n$* | $M_w/M_n$* | $T_g$ (° C.) |
| --- | --- | --- | --- |
| 1 | 2304 | 1.19 | 1.49 |
| 2 | 3874 | 1.18 | 172 |
| 3 | 12726 | 1.38 | 185 |
| 4 | 24298 | 1.40 | 186 |

*Molecular weights of the polymers were determined by gel permeation chromatography (GPC) using a Waters model 150C equipped with four ultrastyragel columns in tetrahydrofuran at 40° C. The molecular weight values reported are relative to polystyrene standards.

Example 3

Glass Transition Temperature Effects

The narrow polydispersity (Mw/Mn) polymers prepared in Examples 1–2 exhibited substantially higher glass transition temperatures than poly(4-hydroxystyrenes) having comparable Mn, but broad polydispersities (Mw/Mn) in the range of 1.8 to 2.4. Results are shown graphically in FIG. 1 where the symbols "■" shows the Mn and Tg of each of the narrow polydispersity polymers, and the "o" shows the Mn and Tg of each of the broad polydispersity polymers.

Example 4

Exposure Radiation Absorbance Effects

Two poly($^4$-hydroxystyrene) polymers were prepared each having a Mn of about 3500 and a polydispersity (Mw/Mn) of about 1.2. The first ("Polymer 1") was prepared using a unimolecular initiating system (1-phenyl-1-(2',2',6', 6'-tetramethyl-1'-piperidinyloxy)ethane (compound 2 above) and no separate free radical initiator as described in Example 1 above. The second polymer ("Polymer 2") was prepared using a bimolecular initiating system, i.e. 2',2',6', 6'-tetramethyl-1'-piperidinyloxy (TEMPO; compound 1 above) together with a free radical initiator of benzoyl peroxide. The optical densities (OD/$\mu$m) at 248 nm for the two polymers was measured. The OD for Polymer 2 was $OD_{248}$=1.1 $\mu$m, while the optical density was considerably lower for Polymer 1 ($OD_{248}$=0.32 $\mu$m) prepared using the unimolecular initiating system.

Example 5

Preparation and Lithographic Processing of Photoresists of the Invention

Eight different negative-acting photoresist compositions (identified herein as Resists 1–8 respectively) w e r e prepared by admixing the following specified components.

Resists 1–6 each contained 1) a solve nt of et hyl lactate in an amount of 82 wt. % of the total resist composition, 2) a poly(vinylphenol) (PVP) resin binder component as specified in Table 2 below in an amount of 16 wt. % of the total resist composition, 3) a photoactive agent of triphenyl sulfonium trifluoromethyl sulfonate in an amount of 5 wt. % of the polymer component, 4) a crosslinker component of the methoxy methylated glycouril sold under the tradename of Powderlink 1174 (American Cyanamid) in an amount of 7.5 wt. % of the polymer component, 5) a basic additive of tetrabutylammonium hydroxide in an amount of 0.06 wt. % of the polymer component, and 6) a leveling agent of the modified polymethyl siloxane sold under the tradename of Silwet surfactant-7604 (Union Carbide) in an amount of 0.2 of total solids of the composition (all components other than ethyl lactate).

Resists 7–8 each contained 1) a solvent of ethyl lactate in an amount of 82 wt. % of the total resist composition, 2) a poly(vinylphenol) (PVP) resin binder component as specified in Table 2 below in an amount of 16.3 wt. % of the total resist composition, 3) a photoactive agent of triphenyl sulfonium trifluoromethyl sulfonate in an amount of 3 wt. % of the polymer component, 4) a crosslinker component of the above-mentioned Powderlink 1174 (American Cyanamid) in an amount of 7.5 wt. % of the polymer component, 5) a basic additive of tetrabutylammonium hydroxide in an amount of 0.2 wt. % of the polymer component, and 6) a leveling agent of the above-mentioned Silwet surfactant-7604 (Union Carbide) in an amount of 0.2 of total solids of the composition (all components other than ethyl lactate).

TABLE 2

| Resist No. | MW Distribution (Mw/Mn) | Polymer Type |
|---|---|---|
| 1 | 2.0 | PVP/5000 Mw/10% hydrogenation* |
| 2 | 2.0 | PVP/5000 Mw/2% hydrogenation* |
| 3 | 2.0 | PVP/5000 Mw |
| 4 | 1.2 | PVP/8000 Mw |
| 5 | 1.18 | PVP/5000 Mw |
| 6 | 1.19 | PVP/2500 Mw |
| 7 | 1.18 | PVP/5000 Mw/12% inert mesylate blocked** |
| 8 | 1.19 | PVP/2500 Mw/12% inert mesylate blocked** |

*The hydrogenated poly(vinyl)phenol resins were PHM-C grade and obtained from Maruzen Oil of Tokyo, Japan. The degree of hydrogenation is the % hydroxyphenyl groups converted to hydroxycycloalkyl groups.
**The % inert mesylate blocking refers to the percent of available hydroxyl groups of the polymer bonded to or "blocked" by mesylate groups.

Resist formulations 1–8 were processed to provide relief images as follows:

Resists 1 through 6:

Each of Resists 1–6 were spin coated onto separate hexamethyldimethylsilane treated silicon wafers at 3000 rpm for 30 seconds. After soft baking at 90° C. for 60 seconds on a vacuum hot plate, the dried resist film layer was exposed to a broadband light using a 0.53 NA GCA XLS Stepper. After exposure the resist film was baked at 105° C. for 60 seconds, followed by immersion development in 0.26 N aqueous tetramethylammonium hydroxide solution. For each of Resists 1 through 6, development time was five times the clear time for unexposed resist.

Resists 7 and 8:

Resists 7 and 8 were processed as described above for Resists 1–6, except the post-exposure bake was conducted for 60 seconds at each of the temperatures of 110° C., 120° C. and 130° C.

Results

Clear times upon development (i.e. no visible organic material in unexposed regions of the coating layer) were determined for each of the resists. Such development or clear times were faster for the resists containing narrow polydispersity polymer as a resin binder than the development times for Resists 1 through 3 that contained the resin binders with higher Mw/Mn. Within the group of Resists 4–8, clear times decreased as molecular weight decreased from 8000 to 5000 and to 2500.

A notable effect of the narrow dispersity polymers was a dewetting seen during development indicating a very clean primed silicon wafer surface remained after develop.

Also, SEM analysis showed that no field residue was associated with the resists made with polymers having no hydrogenation. Some swelling and microbridging was observed for these resists. The swelling and microbridging were most pronounced at the 8000 Mw polymer and decreased with decreasing polymer weight. Overall the best lithographic performance within the narrow polydispersity set was seen with the 2500 Mw narrow dispersity polymer.

Blocking unhydrogenated narrow dispersity polymers with inert blocking groups reduced swelling and microbridging and improved the overall lithographic performance.

The foregoing description of the present invention is merely illustrative thereof, and it is understood that variations and modifications thereof can be made without departing from the spirit or scope of the invention as set forth in the following claims.

What is claimed is:

1. A method for preparation of a narrow molecular weight distribution polyhydroxystyrene resin having a molecular weight of at least 2,000 Daltons and a molecular weight distribution (Mw/Mn) of about 2 or less, said method comprising the steps of providing one or more vinyl phenol monomers where at least a portion of the phenolic hydroxyl groups are protected by a protecting group capable of hydrolyzing in the presence of acid to yield a hydroxyl group; and conducting a free radical polymerization reaction in the presence of a polymerization control agent without the addition of a separate free radical initiator to form a polymer having said protected phenolic hydroxyl group, said molecular weight and said molecular weight distribution.

2. The method of claim 1 where the weight average molecular weight varies between about 2,000 and 100,000 Daltons.

3. The method of claim 1 where the weight average molecular weight varies between about 2,000 and 20,000 Daltons.

4. The method of claim 1 where the protecting group is selected from the group consisting of acetate, alkylsilyl and alkyl esters.

5. The method of claim 4 where the protecting group is acetate.

6. The method of claim 1 where the monomer is a hydroxystyrene.

7. The method of claim 1 where the monomer is a mixture of a hydroxystyrene and an acrylic monomer.

8. The method of claim 1 where the free radical initiator is a peroxide.

9. The method of claim 1 where the polymerization control agent is a nitroxide compound.

10. The method of claim 9 where the nitroxide compound corresponds to the formula:

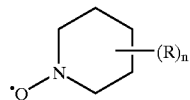

where each R is independently halogen, alkyl or aryl; and n is an integer of from 0 to 10.

11. The method of claim 9 where the nitroxide compound corresponds to the formula:

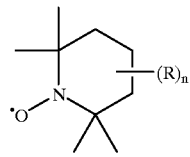

where each R is independently halogen, alkyl or aryl; and n is an integer of from 0 to 10.

12. The method of claim 1 where the free radical polymerization reaction is conducted in the presence of a copper compound.

13. The method of claim 1 including the step of removing the protecting group by hydrolysis.

14. The method of claim 12 where the polymer following hydrolysis has an optical density of about 0.5 absorbance units per micron at 248 nm.

15. The method of claim 12 wherein the polymer following hydrolysis has an optical density of about 0.2 absorbance units or less at 248 nm.

16. A method for preparation of a polyhydroxystyrene resin having a molecular weight of at least 2,000 Daltons and a molecular weight distribution (Mw/Mn) of about 2 or less, the method comprising:

providing one or more vinyl phenol monomers where at least a portion of the phenolic hydroxyl groups are protected by a protecting group capable of hydrolyzing in the presence of acid to yield a hydroxyl group;

conducting a free radical polymerization reaction in the presence of a polymerization control agent without an addition of a separate free radical initiator to form a polymer having the protected phenolic hydroxyl group, the molecular weight and the molecular weight distribution; and removing the protecting group by hydrolysis, wherein the polymer following the hydrolysis has an optical density of about 0.5 absorbance units per micron at 248 nm.

17. The method of claim 16 wherein the polymer following hydrolysis has an optical density of about 0.2 absorbance units or less at 248 nm.

18. The method of claim 16 wherein the weight average molecular weight varies between about 2,000 and 100,000 Daltons.

19. The method of claim 16 wherein the weight average molecular weight varies between about 2,000 and 20,000 Daltons.

20. The method of claim 16 wherein the protecting group is selected from the group consisting of acetate, alkylsilyl and alkyl esters.

21. The method of claim 16 wherein the protecting group is acetate.

22. The method of claim 16 wherein the monomer is a hydroxystyrene.

23. The method of claim 16 wherein the monomer is a mixture of a hydroxystrene and an acrylic monomer.

24. The method of claim 16 wherein the free radical polymerization reaction is conducted in the presence of 1) a polymerization control agent and 2) a separate free radical initiator.

25. The method of claim 11 wherein the polymerization control agent is a nitroxide compound.

26. The method of claim 25 wherein the nitroxide compound corresponds to the formula:

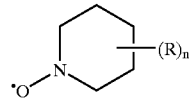

wherein each R is independently halogen, alkyl or aryl; and n is an integer of from 0 to 10.

27. The method of claim 25 wherein the nitroxide compound corresponds to the formula:

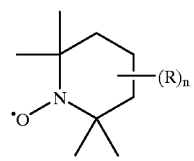

wherein each R is independently halogen, alkyl or aryl; and n is an integer of from 0 to 10.

28. The method of claim 16 wherein the free rad ical polymerization reaction is conducted in the presence of a copper compound.

* * * * *